US012561520B1

(12) United States Patent
Huval et al.

(10) Patent No.: US 12,561,520 B1
(45) Date of Patent: Feb. 24, 2026

(54) PRE-QUALITY ASSURANCE QUALITY ASSESSMENT

(71) Applicant: Hitrust Services Corp., Frisco, TX (US)

(72) Inventors: Jeremy Huval, Celina, TX (US); Bryan Cline, Frisco, TX (US)

(73) Assignee: HITRUST Services Corp., Frisco, TX (US)

( * ) Notice: Subject to any disclaimer, the term of this patent is extended or adjusted under 35 U.S.C. 154(b) by 444 days.

(21) Appl. No.: 17/902,712

(22) Filed: Sep. 2, 2022

(51) Int. Cl.
*G06F 40/20* (2020.01)
*G06Q 10/063* (2023.01)

(52) U.S. Cl.
CPC ........... *G06F 40/20* (2020.01); *G06Q 10/063* (2013.01)

(58) Field of Classification Search
CPC ............... G06F 11/3612; G06F 11/302; G06F 11/3065; G06F 11/3692; G06F 16/93; G06F 21/577; G06F 8/70; G06F 2221/034; G06F 8/73; G06F 16/2365; G06F 40/103; G06F 40/143; G06F 8/61; G06F 11/1438; G06F 11/1469; G06F 11/3068; G06F 11/3082; G06F 11/3419; G06F 11/3476; G06F 11/3624; G06F 16/13; G06F 16/164; G06F 16/168; G06F 16/185; G06F 16/22; G06F 16/24; G06F 16/2433; G06F 16/24553; G06F 16/2456; G06F 16/252; G06F 16/30; G06F 16/334; G06F 16/345; G06F 16/9024; G06F 16/951; G06F 16/9577; G06F 16/986; G06F 17/18; G06F 18/24323; G06F 21/552; G06F 21/604; G06F 2201/805;

G06F 2201/82; G06F 2201/86; G06F 2201/87; G06F 2221/2101; G06F 3/0482; G06F 30/20; G06F 40/131; G06F 40/151; G06F 40/154; G06F 40/166; G06F 40/197; G06F 40/205; G06F 40/226; G06F 40/279; G06F 40/284; G06F 40/30; G06F 8/60; G06F 8/74; G06F 9/453; G06F 9/45512; G06F 9/466; G06F 9/54; G06Q 10/10; G06Q 10/0635; G06Q 30/018; G06Q 10/06; G06Q 10/0639; G06Q 10/103; G06Q 50/26; G06Q 10/06393; G06Q 10/06395; G06Q 10/0875; G06Q 40/08; G06Q 40/12; G06Q 50/16; G06Q 50/18; G06Q 10/063;
(Continued)

(56) References Cited

U.S. PATENT DOCUMENTS 11,030,565 B1 * 6/2021 Haberer ............. G06F 11/3672
11,403,580 B2 * 8/2022 Zulpa ............... G06Q 10/06395
(Continued)

*Primary Examiner* — Abdelali Serrou
(74) *Attorney, Agent, or Firm* — CRGO Global; Steven M. Greenberg

(57) ABSTRACT

Pre-quality assurance (QA) quality estimation (PQE) includes uploading an audit documentation into a memory workspace of an audit data processing system, parsing the audit documentation to identify one or more control statements and one or more textual comments, characterizing the audit documentation according to a set of individual PQE Checks processing a formatting of the audit documentation and a facial appearance of the control statements and textual comments, generating a numeric score from the characterization and assigning the audit documentation for a QA process of specific timeframe and specific rigor in correspondence of the generated score.

18 Claims, 3 Drawing Sheets

(58) Field of Classification Search
CPC ......... G06Q 10/063112; G06Q 10/087; G06Q
10/1097; G06Q 30/0201; G06Q 30/0205;
G06Q 30/0281; G06Q 40/00; G06Q
40/02; G06Q 40/125; G06Q 50/06
See application file for complete search history.

(56) References Cited

U.S. PATENT DOCUMENTS

| | | | |
|---|---|---|---|
| 2013/0290779 A1* | 10/2013 | Mughal | G06F 11/1402 |
| | | | 714/16 |
| 2015/0356477 A1* | 12/2015 | Milkman | G06Q 10/0633 |
| | | | 705/7.27 |
| 2018/0053128 A1* | 2/2018 | Costas | G06Q 50/18 |
| 2018/0260747 A1* | 9/2018 | Bergsma | G16H 40/20 |
| 2019/0102452 A1* | 4/2019 | Dayan | G06F 16/258 |
| 2020/0293575 A1* | 9/2020 | Drubner | G06F 16/906 |
| 2022/0276862 A1* | 9/2022 | Balasubramanian | G06F 8/77 |
| 2024/0078107 A1* | 3/2024 | Gupta | G06F 40/40 |

* cited by examiner

PRE-QUALITY ASSURANCE QUALITY ASSESSMENT

BACKGROUND OF THE INVENTION

Field of the Invention

The present invention relates to the field of compliance auditing and more particularly to quality control with respect to a compliance audit.

Description of the Related Art

An organizational procedure is a process followed formally or informally by an organization in order to achieve an end goal whereas an organizational control is more specifically an action designed to ensure the occurrence or non-occurrence of a contingency. The notion of a policy extends the concept of a procedure or a control as an implicitly understood or expressly stated set of guidelines adhered to be an organization in furtherance of a specific purpose. While a policy can be as simple as a rule, for most organizations of substance, a policy is a collection of rules observed in practice, or reduced in writing to a policy document, or perhaps a set of policy documents. Typical examples include policies pertaining to the way in which an organization manages human resources, policies pertaining to the way in which an organization manages information technology resources, policies pertaining to the way in which an organization operates a production line, or policies pertaining to the manner in which health care services are delivered to patients, to name only a few examples.

In many instances, the formulation and publication of an organization policy is not an arbitrary process. Rather, different independent industry groups have produced and published model policies for various and sundry managerial tasks. To the extent that such policies are accepted by the relevant respective industries, each organization within an industry simply must adapt a corresponding organizational policy to the relevant published standard, often referred to as an authoritative source. However, it is seldom the case that an organization merely copy verbatim the language of a published authoritative source in order to produce a policy. Instead, it is more typically the circumstance that an organization adapt an existing policy to meet in concept each requirement of the relevant authoritative source, or in some instances, multiple different relevant authoritative sources.

On many occasions, it is required that an assurance of compliance be established as between an organization's policies, processes, and controls and implementations of the policies, and an authoritative source such as a controls framework or standard, industry best practice, internally defined controls register, or applicable regulation. For instance, in furtherance of an industrial certification, or the conclusion of a contract with another organization or during due diligence in a merger, acquisition or capital investment may require confirmation of an organization's compliance with an associated authoritative source. But, to conduct a compliance audit of an organization's policies, processes, and/or controls, substantial human capital is required— especially if the authoritative source is extensive and voluminous in nature and when the organization's policies, processes, and controls are complex. Naturally, such a large endeavor is both time consuming and error prone. The problem becomes only compounded in the face of multiple organizational policies, processes, and controls and corresponding multiple applicable authoritative sources.

In particular, part and parcel of the audit process is the generation of formal audit documentation in which audit conclusions and supporting artifacts are placed by an auditor. In an automated format, an outcome of an audit procedure regarding the policies, processes, and controls of a target organization (i.e., auditee) are placed as input into audit documentation. However, to the extent that the submission of the audit conclusions largely requires the manual input by the auditor over a vast set of requirements of an applicable authoritative source, the audit conclusions within the audit documentation oftentimes are incomplete, or worse, incompatible with other audit conclusions resulting in inaccurate and unreliable audit results overall. Thus, to assure compliance with an authoritative source in the course of the technical process of auditing, not only must the policies, processes, and/or controls of the target organization be audited, but similarly the audit conclusions incorporated into audit documentation must be subjected to a second level of evaluation/quality assurance review to assure consistency and accuracy.

Generally, audit documentation can be assigned for review by a set grouping of human resources according to a uniform production schedule. However, in doing so, it is presumed that all audit documentation scheduled for a quality assurance (QA) process is uniform in quality. So much is not the case. In reality, some audit documentation is in a state of quality likely to require less stringent review during QA and therefore less human resources reviewing the audit documentation. However, other audit documentation is in a state of quality likely to require greater review during QA and therefore greater human resources reviewing the audit documentation, not only in number but also in expertise. Yet, the conventional audit process does not accommodate such a distinction in the quality of audit documentation.

BRIEF SUMMARY OF THE INVENTION

Embodiments of the present invention address technical deficiencies of the art in respect to the scheduling of and resource allocation for the QA of audit documentation. To that end, embodiments of the present invention provide for a novel and non-obvious method for pre-QA quality estimation (PQE). Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for PQE includes uploading audit documentation into a memory workspace of an audit data processing system, parsing the audit documentation to identify one or more control statements and one or more textual comments, characterizing the audit documentation according to a set of individual PQE checks processing a formatting of audit documentation and a facial appearance of the control statements and textual comments, generating a numeric score from the characterization and assigning the audit documentation for a QA process of specific timeframe and specific rigor in correspondence of the generated score.

In one aspect of the embodiment, the set of individual PQE Checks include a count of a number of acronym indicators present in the textual comments of the audit documentation. In another aspect of the embodiment, the set of individual PQE Checks include a count of a number of missing resources referenced in the control statements of the audit documentation. In yet another aspect of the embodiment, the specific timeframe is a longer timeframe responsive to a generated score of the audit documentation indicative of a low quality, but of a shorter timeframe responsive to a generated score of the audit documentation indicative of a high quality. Likewise, the specific rigor is a higher degree of rigor inclusive of an application of a higher number of QA rules responsive to a generated score of the audit documentation indicative of a low quality, but of a lower degree of rigor inclusive of an application of a fewer number of QA rules responsive to a generated score of the audit documentation indicative of a high quality. Finally, in even yet another aspect of the embodiment, the generated score is a combination of weighted values, each of the values computed according to a different one of the individual PQE Checks.

In another embodiment of the invention, a data processing system is adapted for PQEestimation. The system includes a host computing platform comprising one or more computers, each with memory and one or processing units including one or more processing cores. The system further includes a PQE module. The module includes computer program instructions enabled while executing in the memory of at least one of the processing units of the host computing platform to upload audit documentation into a memory workspace of an audit data processing system, parse the audit documentation to identify one or more control statements and one or more textual comments, characterize the audit documentation according to a set of individual PQE Checks processing a formatting of the audit documentation and a facial appearance of the control statements and textual comments, generate a numeric score from the characterization and assign the audit documentation for a QA process of specific timeframe and specific rigor in correspondence of the generated score.

In this way, the technical deficiencies of the uniform treatment of audit documentation are overcome owing to strategic scheduling of different audit documentation according to an automated PQE so that audit documents assigned lower grades during PQE are assigned greater QA resources in a longer timeframe which permits enhanced review whereas audit documents assigned higher grades during PQE are assigned lesser QA resources in a shorter time frame which accommodates an ordinary review. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for PQE. In accordance with an embodiment of the invention, audit documentation can be parsed to identify different control statements and also to identify one or more textual comments. The audit documentation is then characterized according to a set of individual PQE Checks which individually process a formatting of the audit documentation and a facial appearance of the control statements and the textual comments. A numeric score is then generated from the characterization so that the audit documentation is assigned a specific timeframe and specific rigor during a QA process of the audit documentation. In this way, different audit documentation can be assigned variable depths of review at variable time frames according to the programmatic determination of pre-QA quality of the audit documentation.

Figure 1:
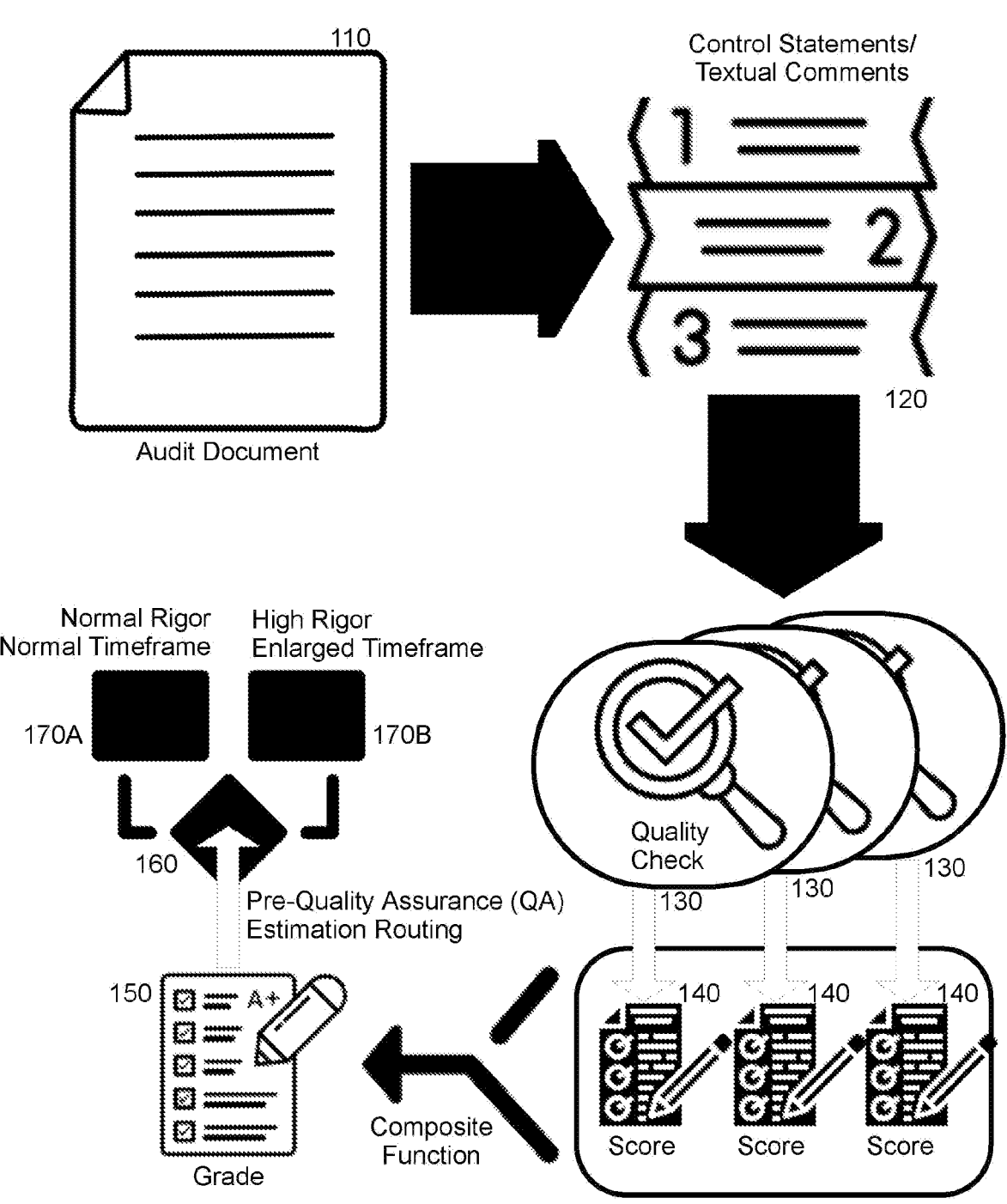
FIG. 1 is a pictorial illustration reflecting different aspects of a process of PQE.

In illustration of one aspect of the embodiment, FIG. 1 pictorially shows a process of PQE. As shown in FIG. 1, an audit document 110 is parsed to extract therefrom both control statements and textual comments 120. Each of the control statements and textual comments 120 are then subjected to a set of PQE Checks 130 in order to produce a corresponding score 140 for each of the PQE Checks 130. In this regard, each of the PQE Checks 130 addresses a particular type of the control statements and textual comments 120, such as determining whether or not a parameterized element referenced in a control statement can be accessed, or whether or not a textual comment is generic in nature, or of a specific type of acronym such as "N/A" or "TBD" or "x" or "-". For each of the PQE Checks 130, a corresponding one of the scores 140 is computed based upon, for example, a number of instances when a referenced artifact in a control statement is determined not to be accessible, or a number of instances when a non-responsive acronym is present in a textual comment.

Thereafter, the individual scores 140 can be composited according to a composite function in order to produce a grade 150 for the audit document 110. In this regard, the composite function can be as simple as a summation of the scores 140, or an averaging of the scores 140. Alternatively, in a more complex circumstance, different ones of the scores 140 can be weighted according to a perceived relevance or importance of a corresponding one of the PQE Checks 130 and the weighted versions of the different scores 140 can be combined as a sum, an average or other such computational manner of composition. Once the grade 150 has been produced for the scores 140, the grade 150 is submitted to a pre-QA decisioning tree 160 which assigns to the audit document 110, a degree of rigor and time frame 170A, 170B.

In particular, to the extent that the audit document 110 has a higher grade 150, a review of normal rigor and normal time frame 170A is assigned. Oppositely, to the extent that the audit document 110 has a lower grade 150, a review of enhanced rigor and greater timeframe 170B is assigned. Other possibilities include requiring a more advanced role of review for an audit document of lower grade 150, a longer time period to perform the QA of the audit document 110 for an audit document of lower grade 150, or a later start date to QA of the audit document 110 of lower grade 150. As another option, to the extent that the grade 150 is below a threshold value, the audit document 110 can be denied scheduling of QA pending resubmission.

Figure 2:
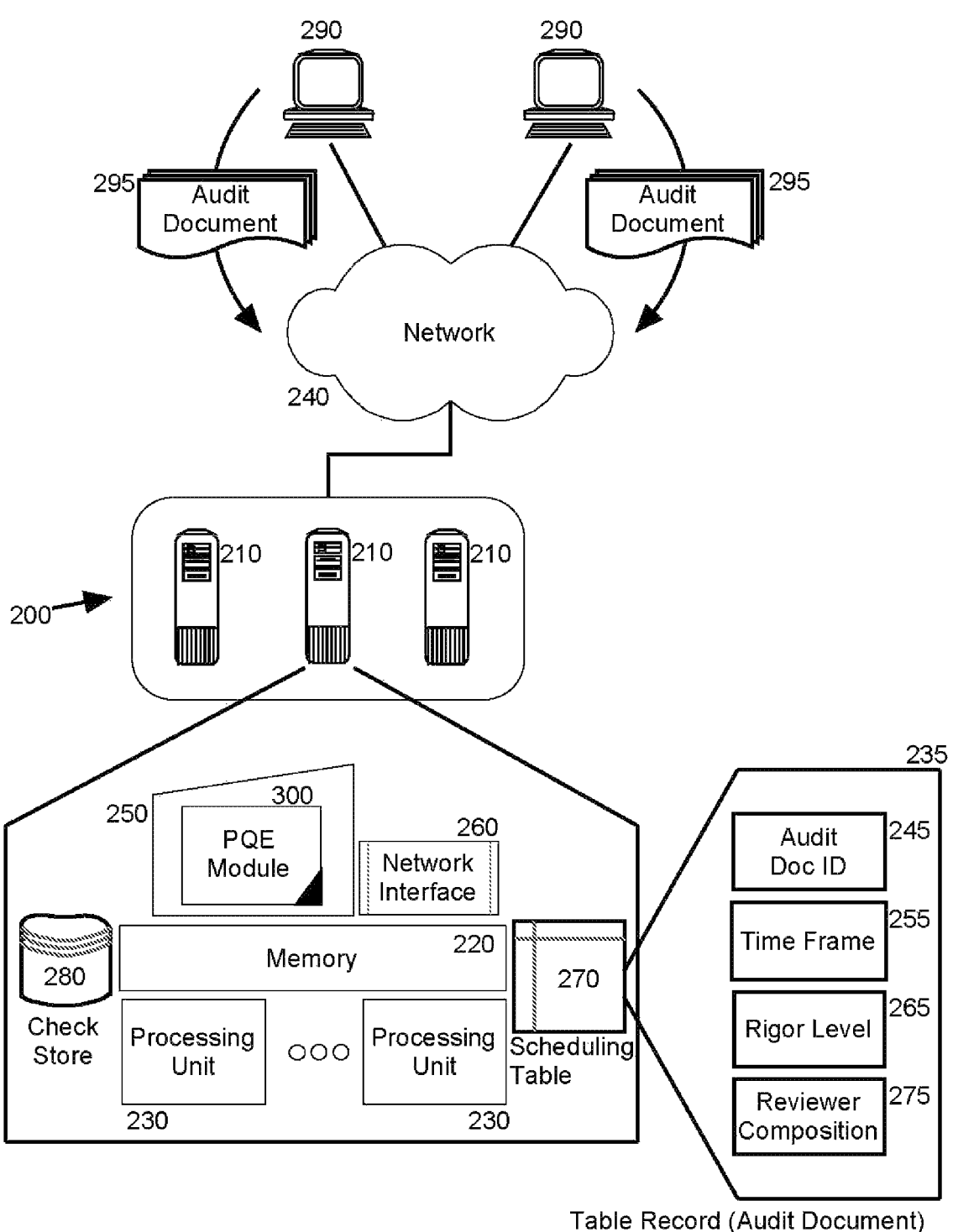
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to perform [statement of the invention]. In the data processing system illustrated in FIG. 1, a host computing platform 200 is provided. The host computing platform 200 includes one or more computers 210, each with memory 220 and one or more processing units 230. The computers 210 of the host computing platform 200 (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for PQE. Specifically, the program instructions during execution receive from over the data communications network 240, different audit documents 295 from different submission client devices 290 in order to subject each of the audit documents 295 to a PQE process managed by the PQE module 300.

More specifically, for each corresponding one of the audit documents 295, the program instructions parse out identified control statements and identified textual comments. The program instructions then apply different checks in a check store 280 of checks to the parsed control statements and identified textual comments in order to compute a score for each of the checks. The program instructions then composite the scores for the checks into a grade for the audit documentation. Based upon the grade, the program instructions write an entry 235 to a scheduling table 270 in the memory 220 of the host computing platform 200. The entry 235 specifies an identifier 245 for the graded one of the audit documents 295, a time frame 255 when the graded one of the audit documents 295 is to be subjected to a QA procedure, a rigor level 265 assigned to the graded one of the audit documents 295—typically a number and nature of tests to be applied to the graded one of the audit documents 295, and a reviewer composition 275 identifying one or more human resource reviewers to perform the QA procedure, one or more roles of human resource reviewers to perform the QA procedure, or both.

Figure 3:
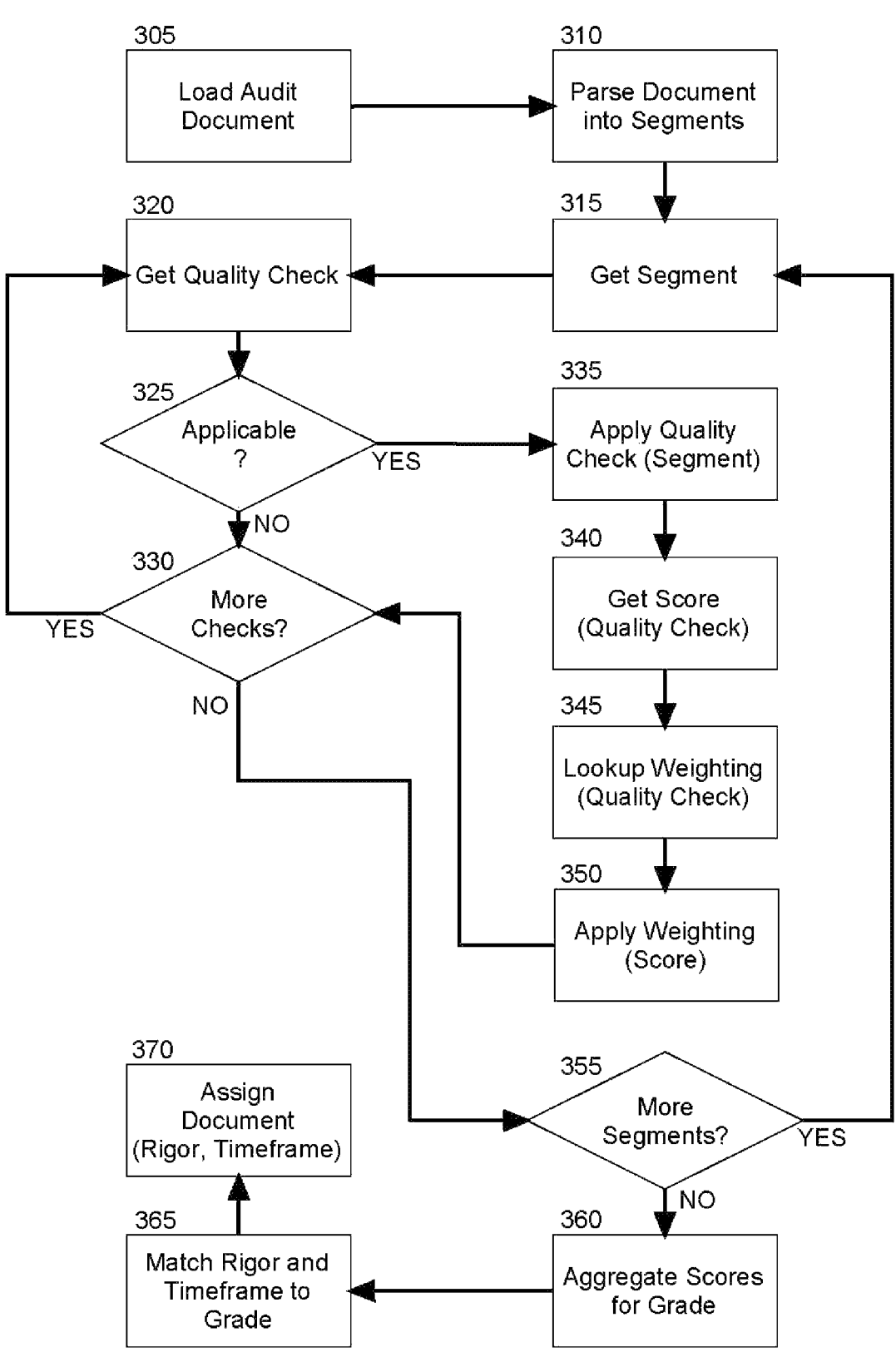

In further illustration of an exemplary operation of the module, FIG. 3 is a flow chart illustrating one of the aspects of the process of FIG. 1. Beginning in block 305, an audit document is loaded for processing. In block 310, the document is parsed into segments including control statements and textual comments and in block 315, a first one of the segments is retrieved for processing and in block 320, a first PQEcheck is retrieved for application. In decision block 325, it is determined if the check is applicable to the retrieved segment. If not, in decision block 330 it is determined if additional checks are available for application. If so, in block 320 a next PQEcheck is retrieved for processing.

In decision block 325, upon determining that a check is applicable to the retrieved segment, in block 335 the PQEcheck is applied to the segment and in block 340, a score is computed based upon the application of the PQEcheck to the segment. Then, in block 345 a weighting is determined for the computed score based upon the PQEcheck. In block 350, the weighting is then applied to the score to produce a weighted score. Thereafter, the process returns to decision block 330 to determine whether or not additional checks remain to be applied to the segment.

In decision block 220, when no further checks remain to be applied to the segment, in decision block 355 it is determined if additional segments remain to be tested. If so, a next segment is retrieved in block 315 and the process repeats. In decision block 355, when no further segments remain to be tested by one or more of the PQE Checks, in block 360 all of the computed scores are aggregated to produce a grade. As such, in block 365, a rigor and time frame value is selected based upon the grade and assigned to the audit documentation. Then, in block 370 the audit documentation is assigned the selected rigor and time frame value.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for pre-quality assurance (QA) quality estimation (PQE) comprising:

uploading audit documentation into a memory workspace of an audit data processing system;

parsing the audit documentation to identify one or more control statements and one or more textual comments;

characterizing the audit documentation according to a set of individual PQE checks processing a formatting of the audit documentation and a facial appearance of the control statements and textual comments;

generating a numeric score from the characterization;

submitting the numeric score to a pre-QA decisioning tree which assigns the audit documentation to a QA procedure of a specific timeframe when the audit documentation is to be subjected to the QA procedure, and of a specific rigor in correspondence to the generated score; and responding to the numeric score falling below a threshold value by denying scheduling of the audit documentation, but otherwise responding to the numeric score exceeding the threshold value by writing an entry to a scheduling table in the memory workspace specifying an identifier for the audit documentation, the timeframe, the specific rigor, and a reviewer composition identifying either one or more human resource reviewers to perform the QA procedure, or one or more roles of human resource reviewers to perform the QA procedure, wherein different audit documentation can be assigned variable depths of review at variable time frames according to programmatic determination of pre-QA quality of the audit documentation.

2. The method of claim 1, wherein the set of individual checks include a count of a number of acronym indicators present in the textual comments of the audit documentation.

3. The method of claim 1, wherein the set of individual PQE Checks include a count of a number of missing resources referenced in the control statements of the audit documentation.

4. The method of claim 1, wherein the specific timeframe is a longer timeframe responsive to a generated score of the audit documentation indicative of a low quality, but of a shorter timeframe responsive to a generated score of the audit documentation indicative of a high quality.

5. The method of claim 1, wherein the specific rigor is a higher degree of rigor inclusive of an application of a higher number of QA rules responsive to a generated score of the audit documentation indicative of a low quality, but of a lower degree of rigor inclusive of an application of a fewer number of QA rules responsive to a generated score of the audit documentation indicative of a high quality.

6. The method of claim 1, wherein the generated score is a combination of weighted values, each of the values computed according to a different one of the individual PQE Checks.

7. A data processing system adapted for pre-quality assurance (QA) quality estimation (PQE), the system comprising:

a host computing platform comprising one or more computers, each with memory and one or processing units including one or more processing cores; and a PQE module comprising computer program instructions enabled while executing in the memory of at least one of the processing units of the host computing platform to perform:

uploading an audit documentation into a memory workspace of an audit data processing system;

parsing the audit documentation to identify one or more control statements and one or more textual comments;

characterizing the audit documentation according to a set of individual PQE Checks processing a formatting of the audit documentation and a facial appearance of the control statements and textual comments;

generating a numeric score from the characterization;

submitting the numeric score to a pre-QA decisioning tree which assigns the audit documentation to a QA procedure of a specific timeframe when the audit documentation is to be subjected to the QA procedure, and of a specific rigor in correspondence of to the generated score; and responding to the numeric score falling below a threshold value by denying scheduling of the audit documentation, but otherwise responding to the numeric score exceeding the threshold value by writing an entry to a scheduling table in the memory workspace specifying an identifier for the audit documentation, the timeframe, the specific rigor, and a reviewer composition identifying either one or more human resource reviewers to perform the QA procedure, or one or more roles of human resource reviewers to perform the QA procedure, wherein different audit documentation can be assigned variable depths of review at variable time frames according to programmatic determination of pre-QA quality of the audit documentation.

8. The system of claim 7, wherein the set of individual PQE checks include a count of a number of acronym indicators present in the textual comments of the audit documentation.

9. The system of claim 7, wherein the set of individual PQE checks include a count of a number of missing resources referenced in the control statements of the audit documentation.

10. The system of claim 7, wherein the specific timeframe is a longer timeframe responsive to a generated score of the audit documentation indicative of a low quality, but of a shorter timeframe responsive to a generated score of the audit documentation indicative of a high quality.

11. The system of claim 7, wherein the specific rigor is a higher degree of rigor inclusive of an application of a higher number of QA rules responsive to a generated score of the audit documentation indicative of a low quality, but of a lower degree of rigor inclusive of an application of a fewer number of QA rules responsive to a generated score of the audit documentation indicative of a high quality.

12. The system of claim 7, wherein the generated score is a combination of weighted values, each of the values computed according to a different one of the individual PQE Checks.

13. A computing device comprising a non-transitory computer readable storage medium having program instructions stored therein, the instructions being executable by at least one processing core of a processing unit to cause the processing unit to perform a method for pre-quality assurance (QA) quality estimation (PQE), the method including:

uploading an audit documentation into a memory workspace of an audit data processing system;

parsing the audit documentation to identify one or more control statements and one or more textual comments;

characterizing the audit documentation according to a set of individual PQE Checks processing a formatting of the audit documentation and a facial appearance of the control statements and textual comments; generating a numeric score from the characterization;

submitting the numeric score to a pre-QA decisioning tree which assigns the audit documentation to a QA procedure of a specific timeframe when the audit documentation is to be subjected to the QA procedure, and of a specific rigor in correspondence of to the generated score; and, responding to the numeric score falling below a threshold value by denying scheduling of the audit documentation, but otherwise responding to the numeric score exceeding the threshold value by writing an entry to a scheduling table in the memory workspace specifying an identifier for the audit documentation, the timeframe, the specific rigor, and a reviewer composition identifying either one or more human resource reviewers to perform the QA procedure, or one or more roles of human resource reviewers to perform the QA procedure, wherein different audit documentation can be assigned variable depths of review at variable time frames according to programmatic determination of pre-QA quality of the audit documentation.

14. The device of claim 13, wherein the set of individual PQE Checks include a count of a number of acronym indicators present in the textual comments of the audit documentation.

15. The device of claim 13, wherein the set of individual PQE Checks include a count of a number of missing resources referenced in the control statements of the audit documentation.

16. The device of claim 13, wherein the specific timeframe is a longer timeframe responsive to a generated score of the audit documentation indicative of a low quality, but of a shorter timeframe responsive to a generated score of the audit documentation indicative of a high quality.

17. The device of claim 13, wherein the specific rigor is a higher degree of rigor inclusive of an application of a higher number of QA rules responsive to a generated score of the audit documentation indicative of a low quality, but of a lower degree of rigor inclusive of an application of a fewer number of QA rules responsive to a generated score of the audit documentation indicative of a high quality.

18. The device of claim 13, wherein the generated score is a combination of weighted values, each of the values computed according to a different one of the individual PQE Checks.

\* \* \* \* \*